United States Patent [19]

Kolb

[11] Patent Number: 4,491,361
[45] Date of Patent: Jan. 1, 1985

[54] INSTALLATION FOR FASTENING A LOWER EDGE AREA OF A TOP COVER AT A REAR FRAME OF A MOTOR VEHICLE

[75] Inventor: Eugen Kolb, Stuttgart, Fed. Rep. of Germany

[73] Assignee: Dr. Ing. h.c.F. Porsche AG, Fed. Rep. of Germany

[21] Appl. No.: 471,657

[22] Filed: Mar. 3, 1983

[30] Foreign Application Priority Data

Mar. 4, 1982 [DE] Fed. Rep. of Germany ....... 3207732

[51] Int. Cl.³ ............................................... B60J 7/00
[52] U.S. Cl. .................................................... 296/107
[58] Field of Search ............................... 296/195, 107

[56] References Cited

U.S. PATENT DOCUMENTS 2,752,192  6/1956  Doty et al. ........................... 296/107
3,096,117  7/1963  Hallenbeck ........................... 296/107
3,276,814  10/1966  Podolan .............................. 296/107

Primary Examiner—Robert R. Song
Attorney, Agent, or Firm—Craig & Burns

[57] ABSTRACT

An installation for fastening a lower edge area of a top cover at a rear frame of a motor vehicle includes a fastening arrangement and a cover covering the fastening arrangement. The arrangement provides a structural simplification and an improved seal between the top cover and the rear frame. The installation includes a rail angularly shaped in cross section, whose first leg facing the passenger space serves as cover member and for fastening at the rear frame, while the second leg that extends approximately parallelly to the lower edge area of the top cover, is designed and constructed for the retention of the lower edge area and of a sealing member provided between the rail and the rear frame.

11 Claims, 2 Drawing Figures

U.S. Patent  Jan. 1, 1985  4,491,361
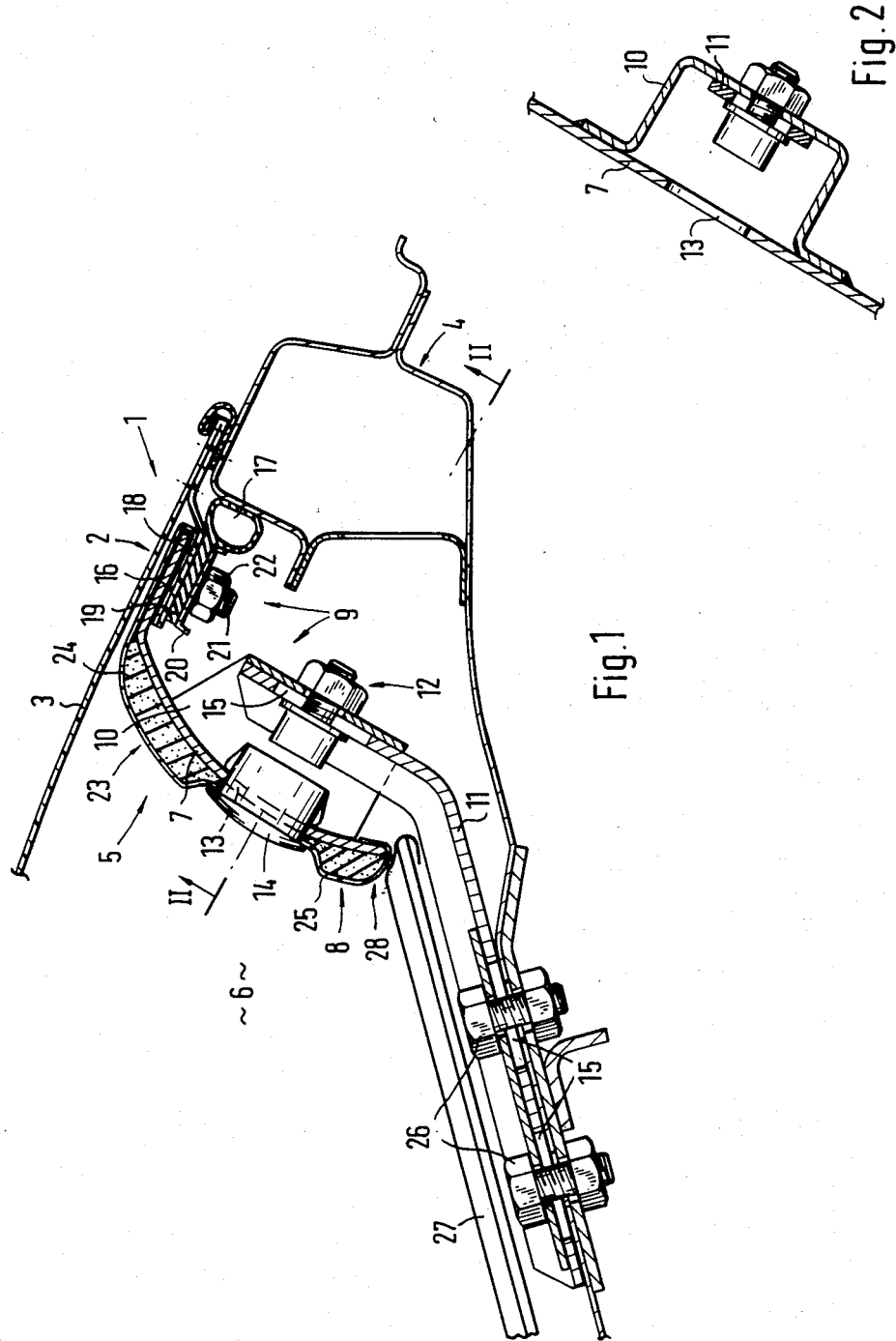

INSTALLATION FOR FASTENING A LOWER EDGE AREA OF A TOP COVER AT A REAR FRAME OF A MOTOR VEHICLE

BACKGROUND OF THE INVENTION

The present invention relates to an installation for fastening a lower edge area of a vehicle top cover at a rear frame of a motor vehicle. The installation includes a fastening arrangement and a covering for the fastening arrangement.

In a prior art arrangement which is generally of the aforementioned type, a pipe-shaped bracket-like member is inserted into an eyelet-like lower edge area of the top cover. Downwardly directed fastening members are provided locally at this pipe-shaped member and are connected with corresponding mounting members of the rear frame. A separate covering serves to cover the fastening arrangement. This prior art arrangement has as disadvantages the fact that for fastening the lower edge area of the top cover and for covering the same in the direction toward the passenger space a large number of structural parts as well as a complicated and expensive assembly are required. Therebeyond, in this prior art arrangement, no sealing member can be provided, for spatial reasons, between the rear frame and the edge area of the top cover, and the bracket-like member, respectively. As a result thereof, the seal between the top cover and the rear frame is inadequate so that disturbing noises are transmitted into the passenger space.

SUMMARY OF THE INVENTION

It is the aim of the present invention to provide an installation for fastening the lower edge of a top cover at the rear frame which includes a structural simplification and which effects an improved seal between top cover and rear frame.

The present invention solves the underlying problems, as indicated above, wherein the installation includes a rail angularly shaped in cross section, whose first leg facing the passenger space serves as covering and fastening at the rear frame, and a second leg extending generally parallel to the lower edge area of the top cover retains the lower edge area and a sealing member provided between the rail and the rear frame.

The advantages primarily achieved with the present invention reside in that by the integration of the fastening arrangement and of the covering therefor into a single angularly shaped rail, a considerable structural simplification is achieved. Therebeyond, assembly expenditures are reduced by the combined securing of the covering and fastening arrangement. An improved seal between the lower edge area of the top cover and the rear frame is achieved by a sealing member clampingly retained at the second leg of the rail. As a result thereof, the transmission of disturbing noises into the passenger space is substantially avoided.

These and other objects, features and advantages of the present invention will become more apparent from the following description when taken in connection with the accompanying drawing which shows, for purposes of illustration only, one embodiment in accordance with the present invention, and wherein:

BRIEF DESCRIPTION OF THE DRAWINGS

FIG. 1 is a center longitudinal cross-sectional view through the lower edge area of a top cover and of an adjoining rear frame in accordance with the present invention; and FIG. 2 is a cross-sectional view taken along line II—II of FIG. 1.

DETAILED DESCRIPTION OF THE PREFERRED EMBODIMENT

Referring now to the drawing wherein like reference numerals are used throughout the two views to designate corresponding parts, the installation illustrated in FIG. 1 and generally designated therein by reference numeral 1 for securing a lower edge area 2 of a top cover 3 at a rear frame 4 of a motor vehicle, includes a rail generally designated by reference numeral 5 which is generally angularly shaped in cross section. A first leg 7 of rail 5 which faces a passenger space 6, provides a covering 8 for a fastening arrangement 9 of the installation 1. At the same time, a support bracket 10 is secured on the side of the leg 7 facing the rear frame 4, which support bracket 10 is connected with a mounting bracket 11 arranged at the rear frame by way of detachable fastening elements 12, for example, bolts or screws. The support bracket 10 is secured at the leg 7 by, for example, welding (see FIG. 2).

For introducing the fastening elements 12 during the assembly of the rail 5 to the rear frame 4, openings 13 are provided locally in the leg 7. After completed assembly, the openings 13 are covered off by means of closure elements 14.

For compensating for manufacturing tolerances, both the securing of the mounting bracket 11 at the rear frame 4 and the support bracket 10 at the mounting bracket 11 are constructed so as to be adjustable. For that purpose, elongated openings 15 are provided in the mounting bracket 11.

A second leg 16 of the rail 5 extending approximately parallel to the lower edge area 2 of the top cover 3 is constructed for the retention of the lower edge area 2 and of a sealing member 17 provided between the rail 5 and the rear frame 4. The fastening of the lower edge area 2 of the top cover 3 and of the sealing member 17 takes place in such a manner that an inwardly offset section 18 of the top cover 3 and a web 19 of the sealing member 17 are clampingly retained between the inner side of the leg 16 and a profile bar 20. Threaded elements (threaded studs 21, nuts 22) are provided locally along the inside of the leg 16 for the retention of the profile bar 20. The connection of the threaded studs 21 with the leg 16 takes place by, for example, welding.

The profile bar 20, the angularly shaped rail 5 and the rear frame 4 have an arcuately shaped contour as viewed in plan view, whereby the free ends extend approximately up to the rear edge of the doors (not shown).

The rail 5 is provided on the side facing the passenger space 6 with a covering 23 that is formed by an inner foam core 24 and an outer facing 25, such as a fabric. The side of the leg 16 facing the top cover 3 is covered off exclusively by the outer fabric 25.

The fastening bolts 26 for the mounting bracket 11 are covered by a rear wall covering which adjoins flush with the free end 28 of the leg 7.

The fastening installation, shown in the illustrated embodiment, is not limited to the vehicle longitudinal center plane but may be repeated in a similar manner at predetermined distances along the rear frame.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for fastening a lower edge area of a top cover at a rear frame means of a motor vehicle, including fastening means and covering means covering said fastening means, comprising rail means angularly shaped in cross section including a first leg facing the passenger space serving as said covering means and as said fastening means at the rear frame means and a second leg extending generally parallel to the lower edge area of the top cover for retaining the lower edge area of the top cover, and a sealing member provided between said rail means and the rear frame means.

2. An installation according to claim 1, wherein the first leg of the rail means is provided locally with support bracket means on the side opposite the passenger space which are connected with mounting bracket means arranged at the rear frame means by way of detachable fastening elements.

3. An installation according to claim 2, wherein the first leg is provided with openings for receiving the fastening elements therethrough, said openings being provided with closure elements.

4. An installation according to claim 3, wherein the rail means is provided on the side thereof facing the passenger space with a covering.

5. An installation according to claim 4, wherein the mounting bracket means is constructed to be adjustable at the rear frame means and the support bracket means is constructed to be adjustable at the mounting bracket means.

6. An installation according to claim 5, wherein an inwardly offset section of the top cover and the sealing member are clampingly retained between the second leg of the rail means and a profile bar.

7. An installation according to claim 6, wherein the profile bar is held in position by locally attached threaded elements.

8. An installation according to claim 1, wherein the rail means is provided on the side thereof facing the passenger space with a covering.

9. An installation according to claim 2, wherein the mounting bracket means is constructed to be adjustable at the rear frame means and the support bracket means is constructed to be adjustable at the mounting bracket means.

10. An installation according to claim 1, wherein an inwardly offset section of the top cover and the sealing means are clampingly retained between the second leg of the rail means and a profile bar.

11. An installation according to claim 10, wherein the profile bar is held in position by locally attached threaded elements.

* * * * *